(12) United States Patent
Jayatilleka et al.

(10) Patent No.: US 11,175,451 B2
(45) Date of Patent: Nov. 16, 2021

(54) MECHANISMS FOR REFRACTIVE INDEX TUNING SEMICONDUCTOR PHOTONIC DEVICES

(71) Applicant: Intel Corporation, Santa Clara, CA (US)

(72) Inventors: Hasitha Jayatilleka, Toronto (CA); Harel Frish, Albuquerque, NM (US); Ranjeet Kumar, San Jose, CA (US); Haisheng Rong, Pleasanton, CA (US); John Heck, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/733,167

(22) Filed: Jan. 2, 2020

(65) Prior Publication Data

US 2020/0150344 A1 May 14, 2020

Related U.S. Application Data

(60) Provisional application No. 62/906,566, filed on Sep. 26, 2019.

(51) Int. Cl.
*G02B 6/12* (2006.01)
*G02B 6/122* (2006.01)
*G02B 6/134* (2006.01)

(52) U.S. Cl.
CPC ......... *G02B 6/1225* (2013.01); *G02B 6/1223* (2013.01); *G02B 6/1347* (2013.01);
(Continued)

(58) Field of Classification Search
CPC .. G02B 6/1225; G02B 6/1223; G02B 6/1347; G02B 6/13; G02B 2006/12061; G02B 2006/1213
(Continued)

(56) References Cited

U.S. PATENT DOCUMENTS

| 2004/0240821 A1* | 12/2004 | Vernon | G02B 6/132 |
| | | | 385/130 |
| 2007/0101927 A1* | 5/2007 | Keyser | G02B 6/136 |
| | | | 117/20 |

(Continued)

OTHER PUBLICATIONS

Xia Chen et al., "Post-Fabrication Phase Trimming of Mach-Zehnder Interferometers by Laser Annealing of Germanium Implanted Waveguides" Photonics Research vol. 5, No. 6, Dec. 2017, 5 pages.

(Continued)

*Primary Examiner* — Robert Tavlykaev
(74) *Attorney, Agent, or Firm* — Schwabe, Williamson & Wyatt, P.C.

(57) ABSTRACT

Embodiments include apparatuses, methods, and systems including a semiconductor photonic device having a waveguide disposed above a substrate. The waveguide has a first section including amorphous silicon with a first refractive index, and a second section including crystalline silicon with a second refractive index different from the first refractive index. The semiconductor photonic device further includes a heat element at a vicinity of the first section of the waveguide. The heat element is arranged to generate heat to transform the amorphous silicon of the first section of the waveguide to partially or completely crystallized crystalline silicon with a third refractive index. The amorphous silicon in the first section may be formed with silicon lattice defects caused by an element implanted into the first section. Other embodiments may also be described and claimed.

21 Claims, 11 Drawing Sheets

(52) U.S. Cl.
CPC ............... *G02B 2006/1213* (2013.01); *G02B 2006/12061* (2013.01)

(58) Field of Classification Search
USPC .......................................................... 385/14
See application file for complete search history.

(56) References Cited

U.S. PATENT DOCUMENTS

| | | | | |
|---|---|---|---|---|
| 2007/0292075 | A1* | 12/2007 | Montgomery | G02F 1/025 385/14 |
| 2008/0253728 | A1* | 10/2008 | Sparacin | G02B 6/122 385/132 |
| 2009/0242019 | A1* | 10/2009 | Ramamoorthy | H01L 31/03926 136/255 |
| 2010/0247029 | A1* | 9/2010 | Li | G02F 1/0147 385/14 |
| 2011/0280512 | A1* | 11/2011 | Abe | G02F 1/377 385/14 |
| 2011/0293216 | A1* | 12/2011 | Lipson | G02B 6/12004 385/14 |
| 2012/0195547 | A1* | 8/2012 | Rasras | G02F 1/2257 385/16 |
| 2012/0288228 | A1* | 11/2012 | Saito | G02B 6/122 385/14 |
| 2014/0035104 | A1* | 2/2014 | Bratkovski | H01L 21/0245 257/616 |
| 2020/0088943 | A1* | 3/2020 | Chen | G02B 6/1347 |

OTHER PUBLICATIONS

M. Milosevic, et al., "Ion Implantation in Silicon for Trimming the Operating Wavelength of Ring Resonators" IEEE Journal of Selected Topics in Quantum Electronics 24, No. 4, 2018.

Bigeng Chen et al., "Real-Time Monitoring and Gradient Feedback Enable Accurate Trimming of Ion-Implanted Silicon Photonic Devices." Optics Express vol. 26, No. 19, Sep. 17, 2018, 11 pages.

C. Li, et al., "A Ring-Resonator-Based Silicon Photonics Transceiver with Bias-Based Wavelength Stabilization and Adaptive-Power-Sensitivity Receiver." In 2013 IEEE International Solid-State Circuits Conference Digest of Technical Papers, 2013.

Xingshi Yu et al., "Ion implantation and electrical annealing for trimming silicon MZIs and facilitating one-time programmable photonic circuits" 2019 IEEE 16th International Conference on Group IV Photonics (GFP), (2019), 2 pages.

David E. Hagan et al., Post-Fabrication Trimming of Silicon Ring Resonators via Integrated Annealing, IEEE Photonics Technology Letters, vol. 31, No. 16, Aug. 15, 2019, 4 pages.

\* cited by examiner

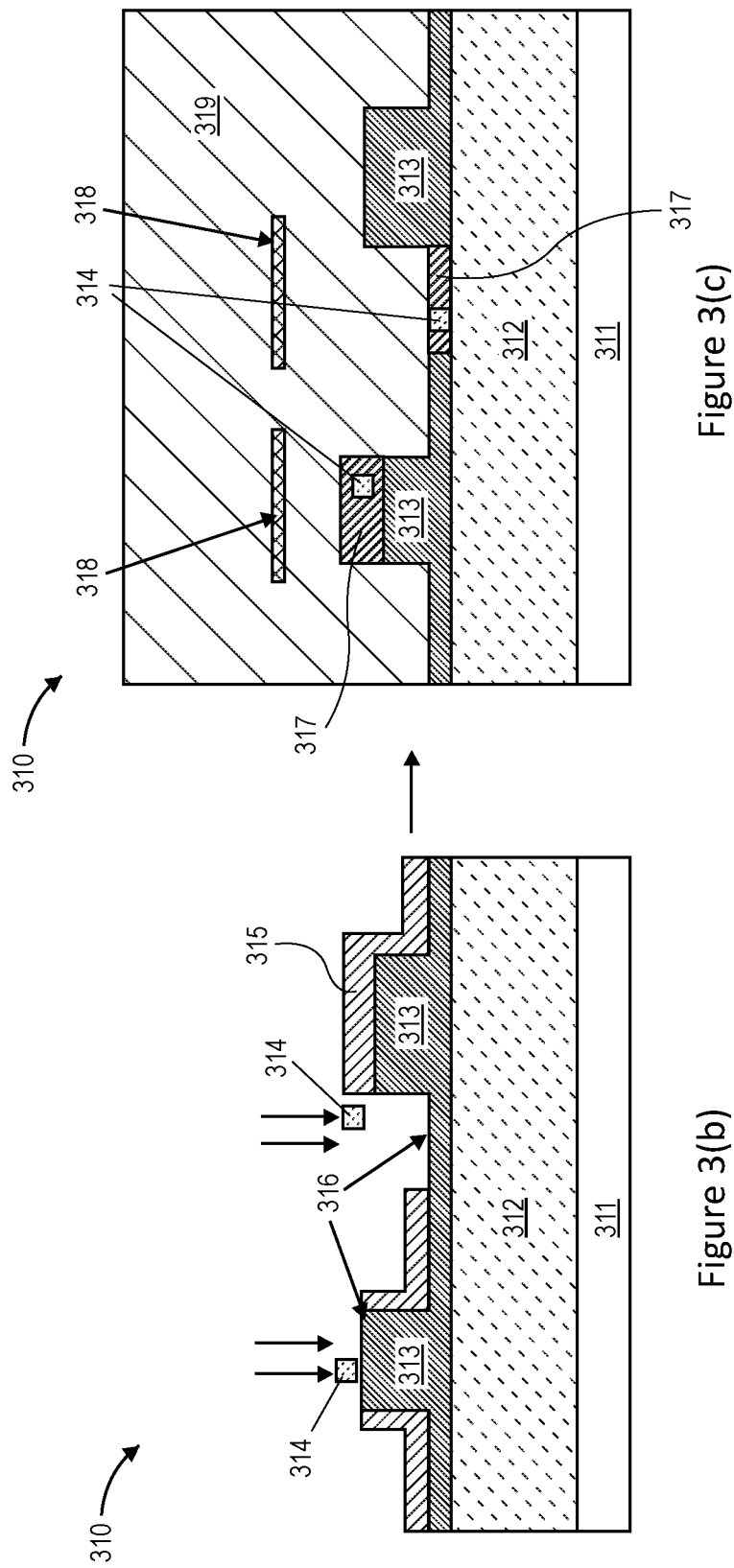

MECHANISMS FOR REFRACTIVE INDEX TUNING SEMICONDUCTOR PHOTONIC DEVICES

CROSS-REFERENCE TO RELATED APPLICATIONS

The present application claims priority to U.S. Provisional Patent Application No. 62/906,566, filed Sep. 26, 2019 and titled "MECHANISMS FOR TRIMMING PHOTONIC DEVICES," the entire disclosure of which is hereby incorporated by reference.

FIELD

Embodiments of the present disclosure generally relate to the field of optoelectronics and, more particularly, to semiconductor photonic devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Growing demands for increasing optical bandwidth may benefit from cost-effective circuits and systems solutions. One option for such cost-effective solutions may be the integration of photonic components on semiconductor devices to form photonic integrated circuits (PICs) or semiconductor photonic devices. Semiconductor, e.g., silicon, photonics have the potential to provide low-power, high-speed, and highly-dense optical interconnects and processing capabilities for data center and high-performance computing systems, and other applications. However, one of the challenging hurdles toward practical deployment of semiconductor photonic systems at scale is that the quality of the semiconductor photonic systems may be sensitive to fabrication variations. Trimming or refractive index tuning semiconductor photonic devices may refer to the process of adjusting the refractive index of semiconductor photonic devices to correct the variations caused by the fabrication or other factors.

BRIEF DESCRIPTION OF THE DRAWINGS

Embodiments of the photonic integrated circuits will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 3(a)-3(c) schematically illustrate processes for forming semiconductor photonic devices including a first section containing amorphous silicon for trimming and a second section containing crystalline silicon, according to various embodiments.

DETAILED DESCRIPTION

Figure 1:
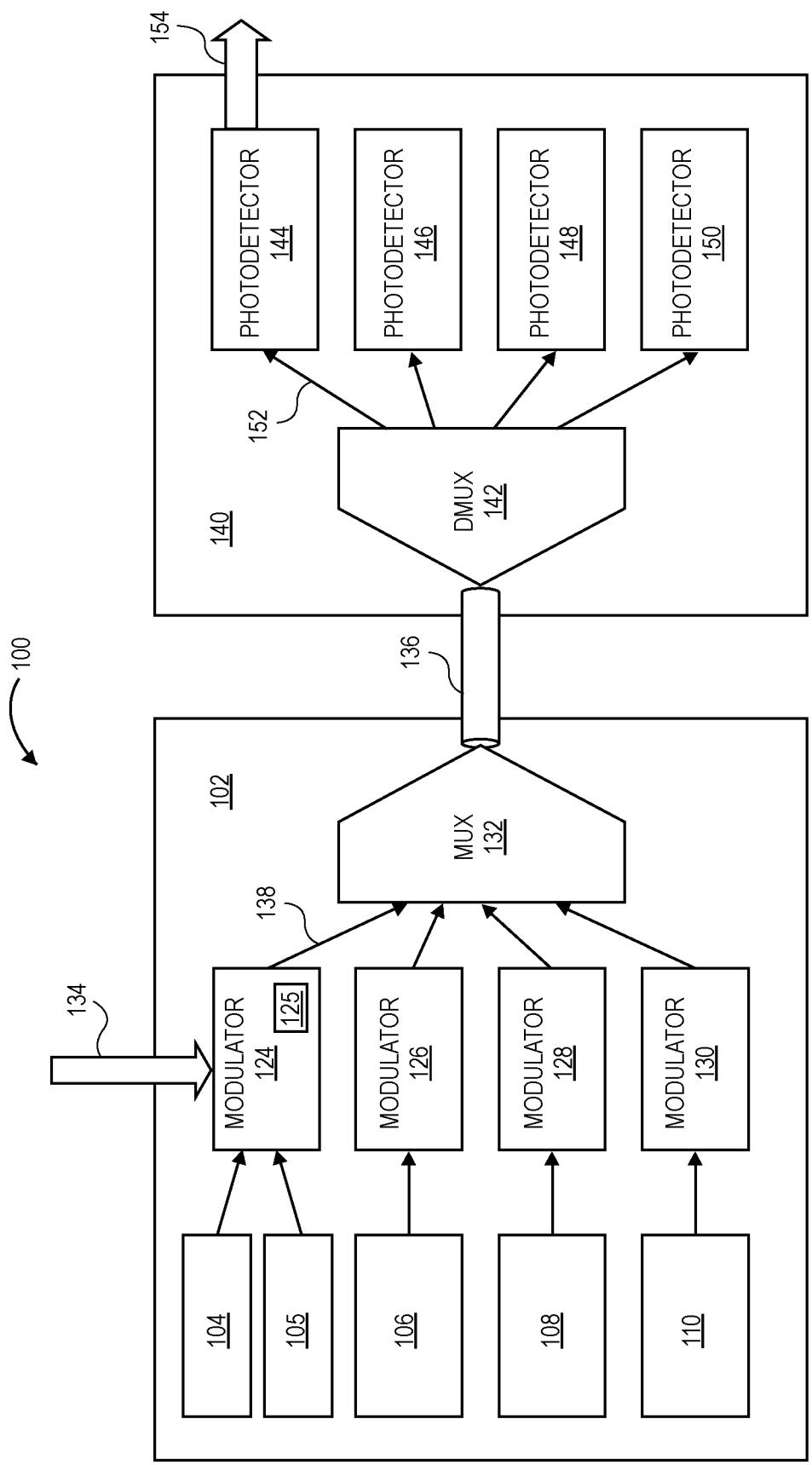
FIG. 1 schematically illustrates an example communication system that utilizes semiconductor photonic devices, according to various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

In the following, silicon photonic systems may be used as examples of semiconductor photonic systems. The descriptions are applicable to other forms of semiconductor photonic systems. One of the most challenging hurdles toward practical deployment of semiconductor photonic systems at scale is that silicon photonic components, e.g., ring resonator modulators, Mach-Zehnder switches, or other silicon photonic components, are highly sensitive to fabrication variations. Several nanometer (nm) variations in the device geometries can cause 100 s of GHz of spectral shifts in their outputs, making these devices unusable without correcting for such variations. Trimming, refractive index tuning, or simply referred to as index tuning, semiconductor photonic devices is the process of adjusting the refractive index of semiconductor photonic devices to correct the variations. Some existing techniques for addressing this challenge for the most part depend on techniques such as post process laser trimming or index tuning of silicon components during real-time operation (typically by heating or injecting/removing carriers from the devices). Laser trimming itself is costly to implement at wafer-scale on a large number of devices. In addition, real-time tuning mechanisms can consume a significant amount of power during device operations, especially in densely integrated systems with a large number of devices. For example, some approaches may use on-chip heaters and feedback control for real-time tuning of refractive index, which may be currently one of the popular methods used in industry to overcome the effects of fabrication variations. However, such real-time tuning can take a significant amount of the available power budget limiting its applicability to large-scale densely integrated systems.

Embodiments herein present mechanisms for correcting fabrication variations by post process phase trimming using implantation of additional elements and on-chip heaters as a scalable, low-cost, and practical solution. Embodiments herein may form amorphous silicon via implantation of additional elements to the crystalline silicon of a waveguide, and use an on-chip heater for enabling precise, yet device specific, trimming, or refractive index tuning semiconductor photonic devices. In embodiments, the refractive index/optical phase trimmable sections, which may contain amorphous silicon, may be created by implanting a suitable element (e.g., Ge, Si, etc.) and placing on-chip heating elements (such as pn junction, resistor) on/near these implanted regions. A heating element is placed in the vicinity of the implanted regions. The implanted regions become amorphized, hence changing the refractive index. After fabrication, through an annealing process, the heaters can supply high temperatures (e.g., larger than 400 C) sufficient to partially or completely recrystallize these optical phase trimmable sections, which adjusts the refractive index back towards the intrinsic index of the crystalline silicon of the waveguide. The annealing process can be controlled precisely on temperature and duration by using feedback loops until the desired device response/spectral shape is reached, thereby correcting for fabrication variations.

The fabrication steps for semiconductor photonic devices presented herein can be integrated into normal silicon photonic product fabrication flows without an appreciable overhead. Additionally, refractive index trimming solutions presented herein can save procurement costs of more expensive tools that will otherwise be required for fabrication variation reduction and process improvement. In general, the refractive index trimming methods shown here can be applied for correcting effects of fabrication variations in a large range of silicon photonic devices (including, but not limited to, Mach-Zehnder interferometers, ring resonators, switches, wavelength multiplexers, waveguide couplers, grating couplers, etc.). As a result of fabrication variation removal, the analysis results demonstrate significant reductions in real-time tuning powers in some silicon photonic products by as much as 85%. Index trimming capability can be enabled at wafer-level test or at the module level, allowing the flexibility to build redundancies and reconfigurable devices/systems into products (much like FPGAs, but for optics), thereby greatly reducing design costs and improving yield.

In various embodiments, a semiconductor photonic device includes a substrate and a waveguide disposed above the substrate. The waveguide has a first section including amorphous silicon with a first refractive index, and a second section including crystalline silicon with a second refractive index different from the first refractive index. The semiconductor photonic device further includes a heat element at a vicinity of the first section of the waveguide. The heat element is arranged to generate heat to transform the amorphous silicon of the first section of the waveguide to partially or completely crystallized crystalline silicon with a third refractive index. The amorphous silicon in the first section may be formed with silicon lattice defects caused by an element implanted into the first section.

In various embodiments, a method for forming a semiconductor photonic device may include forming a waveguide above a substrate. The waveguide includes crystalline silicon with a first refractive index. The method also includes forming a heat element above the waveguide or around a portion of the waveguide, and implanting an element into a first section of the crystalline silicon of the waveguide to cause silicon lattice defects to form amorphous silicon at the first section of the waveguide. The first section including the amorphous silicon has a second refractive index different from the first refractive index. The heat element is arranged to generate heat to transform the amorphous silicon of the first section of the waveguide to partially or completely crystallized crystalline silicon with a third refractive index.

In various embodiments, an optical communication system includes at least one optical apparatus. The optical apparatus includes a substrate, and a waveguide disposed above the substrate. The waveguide has a first section including amorphous silicon with a first refractive index, and a second section including crystalline silicon with a second refractive index different from the first refractive index. The semiconductor photonic device further includes a heat element at a vicinity of the first section of the waveguide. The heat element is arranged to generate heat to transform the amorphous silicon of the first section of the waveguide to partially or completely crystallized crystalline silicon with a third refractive index. The amorphous silicon in the first section may be formed with silicon lattice defects caused by an element implanted into the first section.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

FIG. 1 schematically illustrates an example communication system 100 that utilizes photonic devices, according to various embodiments. The system 100 includes a transmitter chip 102, configured to transmit data to a receiver chip 140. In embodiments, the transmitter chip 102 comprises a PIC within one or more optical modulators 124, 126, 128, 130 optically coupled with the laser devices 104, 105, 106, 108, 110 respectively. It will be understood that the number of on-chip laser devices may vary according to technological needs and constraints. The optical modulators 124, 126, 128, 130, the laser devices 104, 105, 106, 108, 110, are shown for purposes of illustration. Other photonic devices, e.g., Mach-Zehnder interferometers, ring resonators, switches, wavelength multiplexers, waveguide couplers, grating couplers, and more, may be used in the communication system 100, or some other systems.

In embodiments, the modulators 124, 126, 128, 130 may be a Mach-Zehnder interferometer (MZI) modulator or a ring modulator. The outputs of the modulators 124, 126, 128, 130 couple with a multiplexer (MUX) 132. The modulator 124 may include a semiconductor photonic device 125. In some embodiments, the semiconductor photonic device 125 includes a substrate, a waveguide disposed above the substrate, and a heat element at a vicinity of the waveguide. The waveguide has a first section including amorphous silicon with a first refractive index, and a second section including crystalline silicon with a second refractive index different from the first refractive index. The first section including amorphous silicon is for trimming purpose and the first section may be referred to as a trimmable section. The amorphous silicon in the first section of the waveguide may be formed with silicon lattice defects caused by an element implanted into the waveguide or a portion of the waveguide. The heat element is arranged to generate heat for trimming to transform the amorphous silicon of the first section of the waveguide to partially or completely crystallized crystalline silicon with a third refractive index. More details of the semiconductor photonic device 125 may be found in a photonic device 210, a photonic device 220, a photonic device 230, or a photonic device 240, as shown in FIGS. 2(a)-2(h). It should be understood that the chip 102 and receiver chip 140 may include other components (e.g., processors, memory, etc.) that are not shown herein for ease of explanation.

In operation, the optical signals provided by the laser devices 104, 105, 106, 108, 110 may be modulated with electronic data inputs, provided to the modulators (one of the electronic data inputs 134, provided to the modulator 124, is shown for purposes of clarity). The optical signals carrying the data information (e.g., 138) are multiplexed by the multiplexer 132 and the resulting data signal may be provided to an optical data communication channel 136 (e.g., optical fiber cable) for transmission. In embodiments, the length of the optical channel 136 may vary, e.g., from a few meters to a few kilometers.

On the receiver chip 140 side, the optical signal is de-multiplexed by the demultiplexer (DMUX) 142, and de-multiplexed optical data signals (e.g., 152) are provided to respective photodetectors 144, 146, 148, 150. The photodetectors 144, 146, 148, 150 may convert received optical data signals into an electronic form and provide resulting electronic data signals (e.g., 154) for further processing.

FIGS. 2(a)-2(h) schematically illustrate block diagrams of semiconductor photonic devices, e.g., the photonic device 210, the photonic device 220, the photonic device 230, and the photonic device 240, including a first section containing amorphous silicon for trimming and a second section containing crystalline silicon, according to various embodiments. In embodiments, the photonic device 210, the photonic device 220, the photonic device 230, and the photonic device 240 may be examples of the semiconductor photonic device 125 as shown in FIG. 1.

Figure 2A:
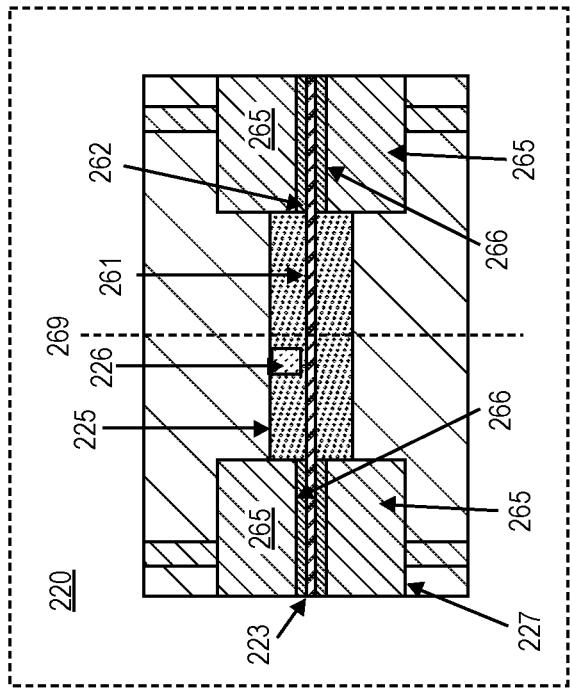
FIGS. 2(a)-2(h) schematically illustrate block diagrams of semiconductor photonic devices including a first section containing amorphous silicon for trimming and a second section containing crystalline silicon, according to various embodiments.
Figure 2C:
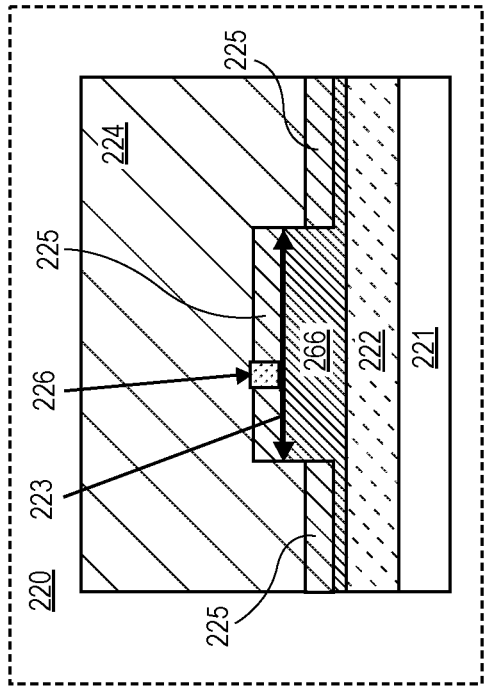
Figure 2B:
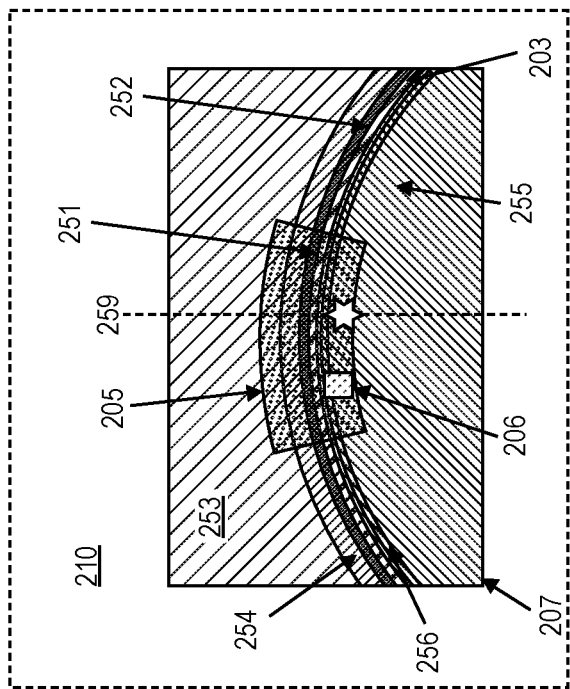

FIG. 2(a) illustrates a top view of the photonic device 210, while FIG. 2(b) illustrates a cross section view along a line 259 of the top view of the photonic device 210. In embodiments, the photonic device 210 includes a substrate 201 and a buried oxide layer 202 disposed above the substrate 201. A waveguide 203 is disposed above the buried oxide layer 202. The waveguide 203 includes a first section 251 containing amorphous silicon with a first refractive index, and a second section 252 including crystalline silicon with a second refractive index different from the first refractive index. The amorphous silicon in the first section 251 may be formed with silicon lattice defects caused by an element 206 implanted into the first section 251 of the waveguide 203. A heat element 207 may be disposed at a vicinity of the waveguide 203. The element 206 may be implanted into an implanted region 205 that includes the first section 251 of the waveguide 203, and a part of the heat element 207. In general, the implanted region 205 may include the first section 251 of the waveguide 203, and further overlaps or covers a portion of the heat element 207. The heat element 207 is arranged to generate heat to transform the amorphous silicon of the first section 251 of the waveguide 203 to partially or completely crystallized crystalline silicon with a third refractive index. Hence, the first section 251 may be referred to as a phase trimmable section since its refractive index can be changed by controlling the heat element to transform the amorphous silicon of the first section 251 to partially or completely crystallized crystalline silicon.

In addition, one or more dielectric layers 204 are disposed to embed the waveguide 203 and the heat element 207, where the one or more dielectric layers 204 include a dielectric material. In some embodiments, there may be a feedback loop to control the heat element 207 to generate heat to warm up the amorphous silicon of the first section 251 to transform the amorphous silicon of the first section 251 of the waveguide 203 to the partially or completely crystallized crystalline silicon with the third refractive index so that the third refractive index is substantially equal, e.g., in a range of about 95% to 105%, to the second refractive index.

In embodiments, the element 206 implanted into the first section 251 and the implanted region 205 may include Ge, Si, Boron, Arsenic, Phosphorus, Carbon, Helium, or Antimony. In some embodiments, there may be multiple elements implanted into the first section 251 or the implanted region 205. The element 206 is implanted into the first section 251 with an implantation ion dose ranging from about $3*10^{13}/cm^2$ to about $5*10^{15}/cm^2$ at an implantation energy ranging from about 30 KEV to 120 KEV. The first section 251 may have a volume so that when the amorphous silicon of the first section 251 of the waveguide 203 is transformed into the completely crystallized silicon, a phase shift in light propagating in the waveguide 203 is larger than or equal to 2 pi compared to the waveguide with the first section 251 having the amorphous silicon.

In embodiments, the heat element 207 may include poly-Si, TiN, TaN, indium tin oxide (ITO), a transparent conductor, an electrically resistive metal material, a pn junction, or a doped silicon. The heat element 207 is to generate heat to warm up the amorphous silicon of the first section 251 to a temperature around 400 C to around 800 C to transform the amorphous silicon of the first section 251 of the waveguide 203 to the partially or completely crystallized crystalline silicon.

In embodiments, the substrate 201 may include a material selected from the group consisting of a silicon substrate, a glass substrate, a metal substrate, and a plastic substrate. The waveguide 203 may comprise a slab waveguide, a strip waveguide, a rib waveguide, or a surface ridge waveguide, and the waveguide 203 includes Si or SiN. The waveguide 203 may be of various shape, e.g., a circular shape, a square shape, a rectangular shape, or other shapes. The dielectric material in the dielectric layer 204 includes a material selected from the group consisting of silicon dioxide (SiO2), carbon doped oxide (CDO), silicon nitride, perfluorocyclobutane, polytetrafluoroethylene, fluorosilicate glass (FSG), organic polymer, silsesquioxane, siloxane, and organosilicate glass. The semiconductor photonic device 210 may be a Mach-Zehnder interferometer, a ring resonator, a switch, a wavelength multiplexer, a waveguide coupler, or a grating coupler.

In embodiments, the heat element 207 may be apn junction or doped silicon formed around side surfaces of the waveguide, and the implanted region further extends to include a portion of the pn junction or doped silicon. As shown in FIG. 2(a) and FIG. 2(b), the heat element 207 is a pn junction including a p-doping area 255, a p-doping area 256, an n-doping area 254, and an n-doping area 253. The p-doping area 255 and the p-doping area 256 may have different concentration levels, and similarly, the n-doping area 254 and the n-doping area 253 may have different concentration levels. In some embodiments, the p-doping area 255 and the p-doping area 256 may have a same concentration level, or the n-doping area 254 and the n-doping area 253 may have a same concentration level. The p-doping area 256 and the n-doping area 254 may be formed around side surfaces of the waveguide 203. The waveguide 203, the p-doping area 255 and the p-doping area 256, the n-doping area 254 and the n-doping area 253 may be of a circular shape.

In embodiments, the implanted region 205 may include the first section 251 of the waveguide 203, and further includes a portion of the p-doping area 255, the p-doping area 256, the n-doping area 254, and the n-doping area 253. By dividing the waveguide 203 into the first section 251 and the second section 252, and the implanted region 205 only includes the first section 251, and further includes a portion of the p-doping area 255, the p-doping area 256, the n-doping area 254, and the n-doping area 253, embodiments herein have more precise control over the location of the implanted region 205, which may be more efficient than implanting into the entire waveguide 203.

Figure 2D:
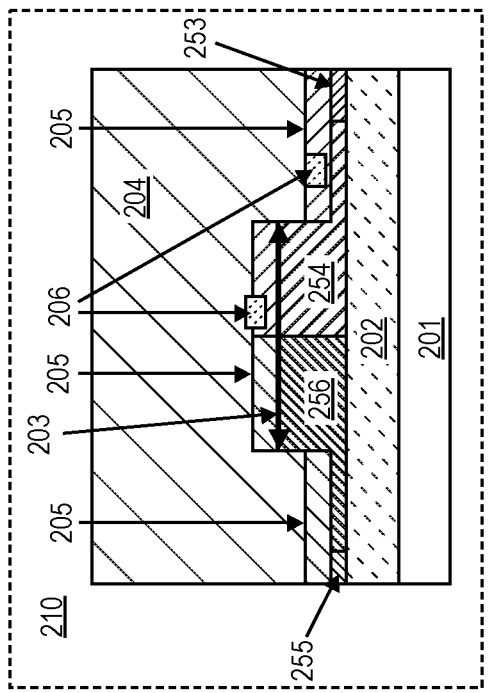

FIG. 2(c) illustrates a top view of the photonic device 220, while FIG. 2(d) illustrates a cross section view along a line 269 of the top view of the photonic device 220. In embodiments, the photonic device 220 includes a substrate 221 and a buried oxide layer 222 disposed above the substrate 221. A waveguide 223 is disposed above the buried oxide layer 222. The waveguide 223 includes a first section 261 containing amorphous silicon with a first refractive index, and a second section 262 including crystalline silicon with a second refractive index different from the first refractive index. The amorphous silicon in the first section 261 may be formed with silicon lattice defects caused by an element 226 implanted into the first section 261 of the waveguide 223. A heat element 227 may be disposed at a vicinity of the waveguide 223. The element 226 may be implanted into an implanted region 225 that includes the first section 261 of the waveguide 223, and a part of the heat element 227. The heat element 227 is arranged to generate heat to transform the amorphous silicon of the first section 261 of the waveguide 223 to partially or completely crystallized crystalline silicon with a third refractive index. In addition, one or more dielectric layers 224 are disposed to embed the waveguide 223 and the heat element 227, where the one or more dielectric layers 224 include a dielectric material.

In embodiments, the heat element 227 may be doped silicon formed around side surfaces of the waveguide 223, including a doped area 265, e.g., a p-doping or n-doping area, and a doped area 266 formed around side surfaces of the waveguide 223. The doped area 265 and the doped area 266 may have different concentration levels. In some other embodiments, the doped area 265 and the doped area 266 may have a same concentration level. The waveguide 223, the doped area 265, and the doped area 266 may be of a rectangular shape.

Figure 2G:
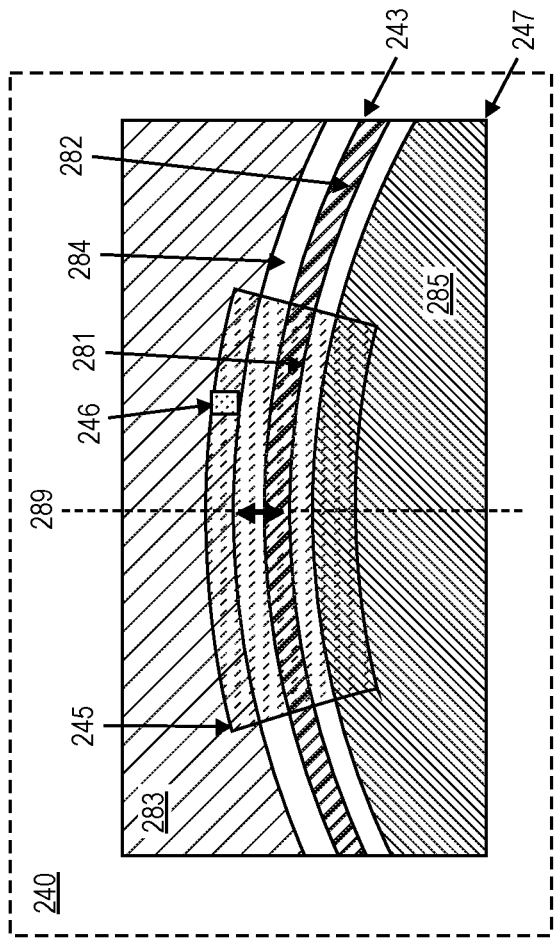
Figure 2H:
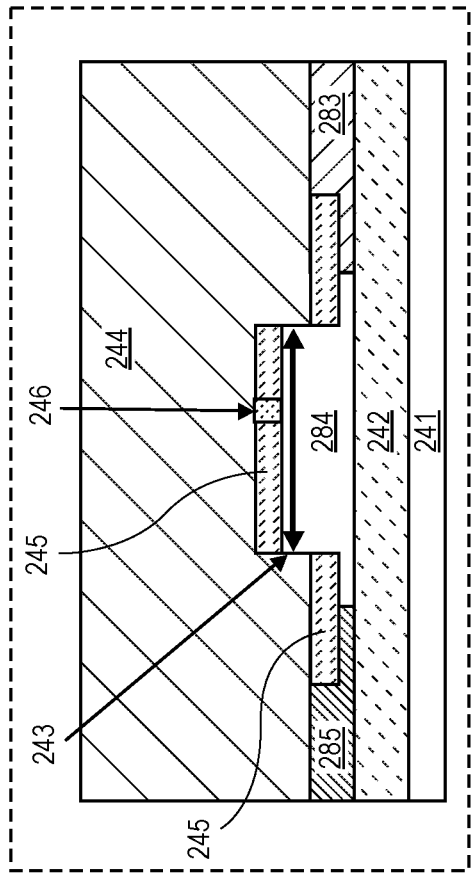
Figure 2E:
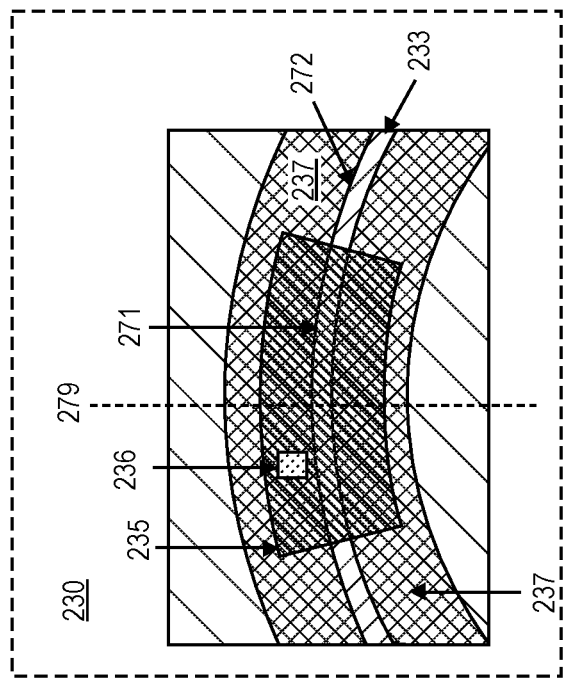
Figure 2F:
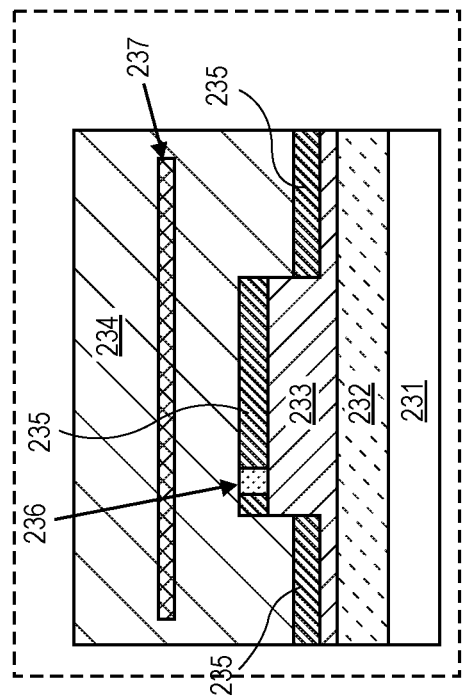

FIG. 2(e) illustrates a top view of the photonic device 230, while FIG. 2(f) illustrates a cross section view along a line 279 of the top view of the photonic device 230. In embodiments, the photonic device 230 includes a substrate 231 and a buried oxide layer 232 disposed above the substrate 231. A waveguide 233 is disposed above the buried oxide layer 232. The waveguide 233 includes a first section 271 containing amorphous silicon with a first refractive index, and a second section 272 including crystalline silicon with a second refractive index different from the first refractive index. The amorphous silicon in the first section 271 may be formed with silicon lattice defects caused by an element 236 implanted into the first section 271 of the waveguide 233. A heat element 237 may be disposed at a vicinity of the waveguide 233, e.g., above the waveguide 233. The heat element 237 may include an electrically resistive metal material. The heat element 237 is arranged to generate heat to transform the amorphous silicon of the first section 271 of the waveguide 233 to partially or completely crystallized crystalline silicon with a third refractive index. In addition, one or more dielectric layers 234 are disposed to embed the waveguide 233 and the heat element 237, where the one or more dielectric layers 234 include a dielectric material. The element 236 may be implanted into an implanted region 235 that includes the first section 271 of the waveguide 233, and a part of the dielectric layers 234. The waveguide 233 and the heat element 237 may be of a circular shape.

FIG. 2(g) illustrates a top view of the photonic device 240, while FIG. 2(h) illustrates a cross section view along a line 289 of the top view of the photonic device 240. In embodiments, the photonic device 240 includes a substrate 241 and a buried oxide layer 242 disposed above the substrate 241. A waveguide 243 is disposed above the buried oxide layer 242. The waveguide 243 includes a first section 281 containing amorphous silicon with a first refractive index, and a second section 282 including crystalline silicon with a second refractive index different from the first refractive index. The amorphous silicon in the first section 281 may be formed with silicon lattice defects caused by an element 246 implanted into the first section 281 of the waveguide 243. A heat element 247 may be disposed at a vicinity of the waveguide 243. The element 246 may be implanted into an implanted region 245 that includes the first section 281 of the waveguide 243, and a part of the heat element 247. The heat element 247 is arranged to generate heat to transform the amorphous silicon of the first section 281 of the waveguide 243 to partially or completely crystallized crystalline silicon with a third refractive index. In addition, one or more dielectric layers 244 are disposed to embed the waveguide 243 and the heat element 247, where the one or more dielectric layers 244 include a dielectric material.

The waveguide 243 may be a rib waveguide, while the first section 281 and the second section 282 are at the inner rib of the waveguide 243. The waveguide 243 further includes an outer slab 284. In embodiments, the heat element 247 may be a pn junction including a p-doping area 285 and an n-doping area 283. The p-doping area 285 and the n-doping area 283 may be formed around side surfaces of the waveguide 243. The implanted region 245 may include the first section 281 of the waveguide 243, a part of the outer slab 284, and a part of the heat element 247. The waveguide 243, the p-doping area 285 and the n-doping area 283 may be of a circular shape.

According to the embodiments presented herein, there may be many different implementations. For example, the implantation section, e.g., the implanted region 205, the implanted region 225, the implanted region 235, or the implanted region 245, may be a Ge-doping area. This implantation changes the silicon waveguide's material composition from crystalline to amorphous at the implanted region, which causes a large refractive index change in the waveguide. Similarly, in lieu of Ge, other materials such as Si, but not limited to, can be used as a dopant to form the amorphous silicon at a trimmable section for the index change. The implantation shapes are also not limited to the geometries shown in FIGS. 2(a)-2(h) and the devices need not be limited to waveguides. In embodiments, the implantation happens on or in the vicinity of an optical device such that the light in the device interacts/overlaps with the implanted region. After fabrication, the heating element near the implanted waveguide is driven to anneal the waveguide. Due to the high temperatures applied, the amorphous silicon starts to re-crystallize and gradually change its refractive index. Therefore, by controlling the anneal temperatures and the durations, the refractive index of the waveguide segment can be precisely tuned. The length (or generally, the geometry) of the Ge implant region is chosen such that a full-anneal (i.e., complete recrystallization) will result an index change sufficient to introduce a >2 pi phase shift in light propagating in the waveguide. In some embodiments, 2 pi phase change may be sufficient to correct for most of the adverse effects that arise from fabrication variations. The four geometries shown in FIGS. 2(a)-2(h) use 3 types of heating elements to apply the necessary temperatures to the waveguide: pn junction (diode), doped silicon, or metal heater. In some embodiments, these heating elements can deliver the high temperatures, typically, in excess of 400 C required for annealing. Based on experimental measurements on fabricated devices, it is estimated that doped Si heaters can reach temperatures in excess of 500 C and that metal heaters can reach temperatures in excess of 800 C. Since the re-crystallization process only happens at high temperatures, there would not be any appreciable change in the waveguide's refractive index during normal operating conditions.

Figure 3A:
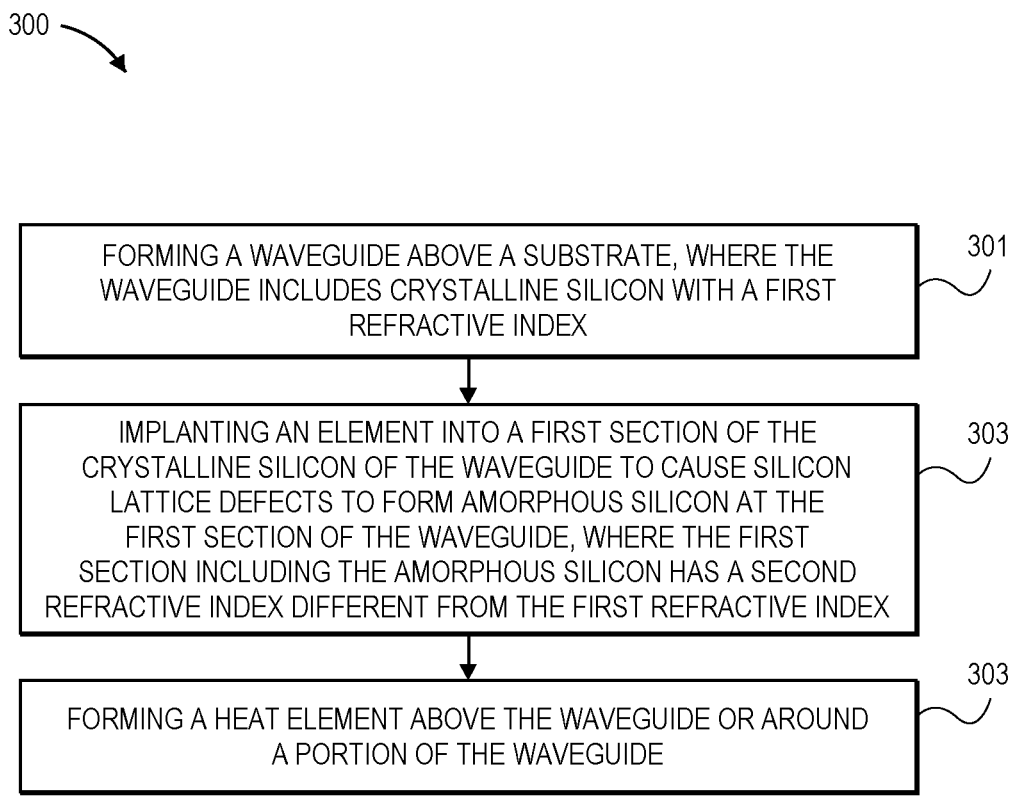

FIGS. 3(a)-3(c) schematically illustrate processes, e.g., a process 300, for forming a semiconductor photonic device 310 including a first section containing amorphous silicon for trimming and a second section containing crystalline silicon, according to various embodiments. In embodiments, the process 300 may be performed to form the photonic device 210, the photonic device 220, the photonic device 230, or the photonic device 240, as shown in FIGS. 2(a)-2(h), or the semiconductor photonic device 310 shown in FIGS. 3(b)-3(c).

At a block 301, the process 300 may include forming a waveguide above a substrate, where the waveguide includes crystalline silicon with a first refractive index. For example, as shown in FIG. 3(b), at the block 301, the process 300 may include forming a waveguide 313 above a substrate 311, where the waveguide 313 includes crystalline silicon with a first refractive index. There may be a buried oxide layer 312 disposed above the substrate 311 formed before forming the waveguide 313.

At a block 303, the process 300 may include implanting an element into a first section of the crystalline silicon of the waveguide to cause silicon lattice defects to form amorphous silicon at the first section of the waveguide. The first section including the amorphous silicon has a second refractive index different from the first refractive index. For example, as shown in FIG. 3(c), at the block 303, the process 300 may include implanting an element 314 into a first section 317 of the crystalline silicon of the waveguide 313 to cause silicon lattice defects to form amorphous silicon at the first section 317 of the waveguide 313. In detail, as shown in FIG. 3(b), at the block 303, the process 300 may form a mask layer 315 over the waveguide 313, and form one or more openings, e.g., opening 316, of the masking layer 315, and further implant the element 314 into the first section 317 of the crystalline silicon through the one or more openings 316. After the implanting operation has been performed, the mask layer 315 may be removed.

At a block 305, the process 300 may include forming a heat element above the waveguide or around a portion of the waveguide. The heat element is arranged to generate heat to transform the amorphous silicon of the first section of the waveguide to partially or completely crystallized crystalline silicon with a third refractive index. For example, as shown in FIG. 3(c), at the block 305, the process 300 may include forming a heat element 318 above the waveguide 313. The heat element 318 is arranged to generate heat to transform the amorphous silicon of the first section 317 of the waveguide 313 to partially or completely crystallized crystalline silicon with a third refractive index. In addition, the process 300 may further include forming one or more dielectric layers 319 disposed to embed the waveguide 313 and the heat element 318, where the one or more dielectric layers 319 include a dielectric material.

In some other embodiments, a heat element may be formed around a portion of the waveguide, before implanting an element into a first section of the crystalline silicon of the waveguide to cause silicon lattice defects to form amorphous silicon at the first section of the waveguide. Process 300 may further include operations performed before the operations included in the block 301, between the block 301 and the block 303, or between the block 303 and the block 305, or after the block 305, to form the photonic device 210, the photonic device 220, the photonic device 230, or the photonic device 240, as shown in FIGS. 2(a)-2(h).

Figure 4A:
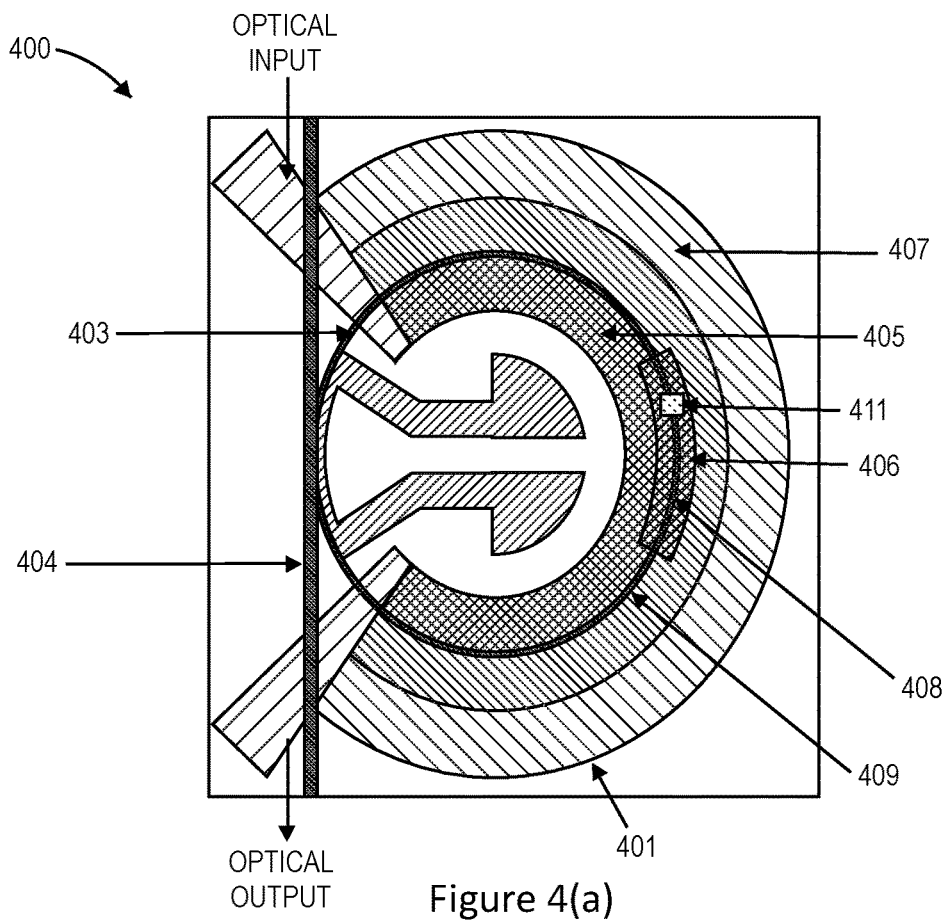
FIGS. 4(a)-4(c) schematically illustrate optical phase shift achieved by a semiconductor photonic device including a first section containing amorphous silicon for trimming and a second section containing crystalline silicon, according to various embodiments.
Figure 4B:
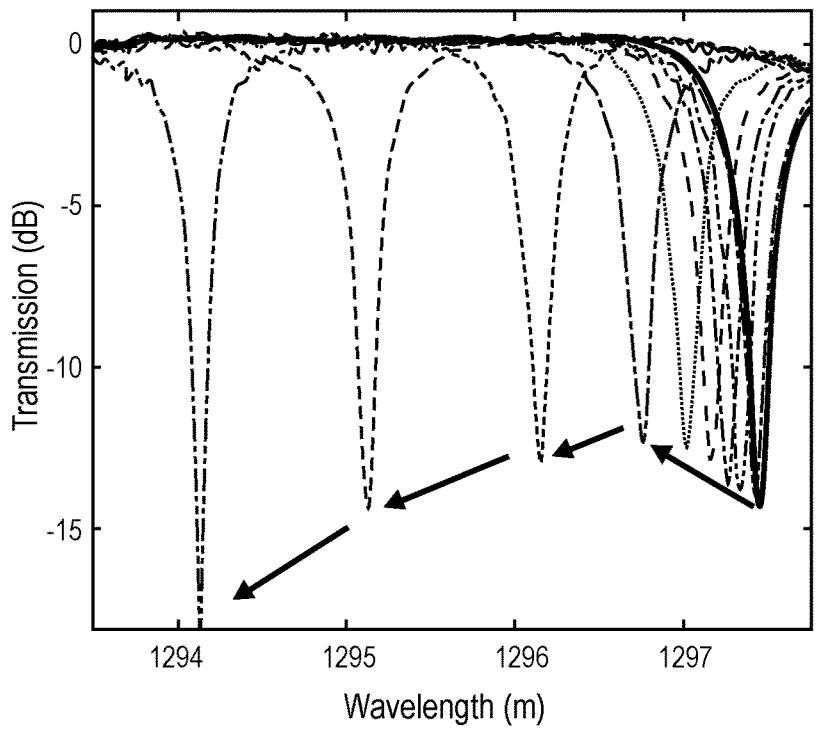
Figure 4C:
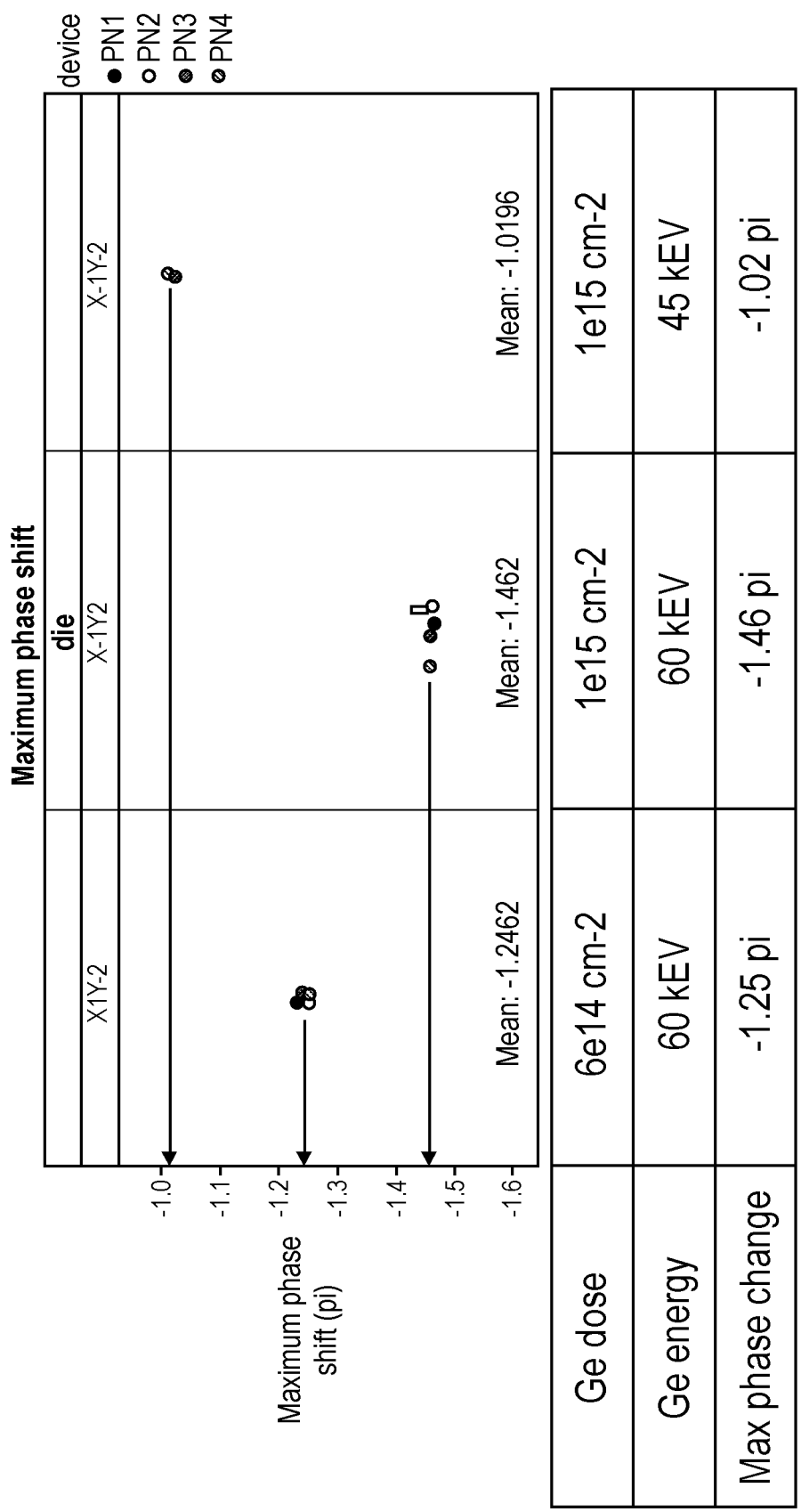

FIGS. 4(a)-4(c) schematically illustrate optical phase shift achieved by a semiconductor photonic device 400 including a first section 408 containing amorphous silicon for trimming and a second section 409 containing crystalline silicon, according to various embodiments. The semiconductor photonic device 400 may be a silicon ring resonator modulator.

In embodiments, as shown in FIG. 4(a), the semiconductor photonic device 400 may include a circular waveguide 403 and a rectangular waveguide 404. The semiconductor photonic device 400 further includes a heat element 401 around side surfaces of the waveguide 403. The heat element 401 is a pn junction, including a p-doping area 405 and an n-doping area 407, similar to the heat element 207 as shown in FIG. 2(a). The waveguide 403 includes the first section 408 containing amorphous silicon and the second section 409 containing crystalline silicon. The semiconductor photonic device 400 further includes an implanted region 406, where the implanted region 406 includes the first section 408 and a portion of the heat element 401. An element 411, e.g., Ge, may be implanted into the implanted region 406. The first section 408 may be referred to as a phase trimmable section. The first section 408 may have a length about 10 um. Similar to FIG. 2(a), the Ge implantation is introduced on to a pn junction, which can be forward biased to generate the heat for annealing.

Figure 6A:
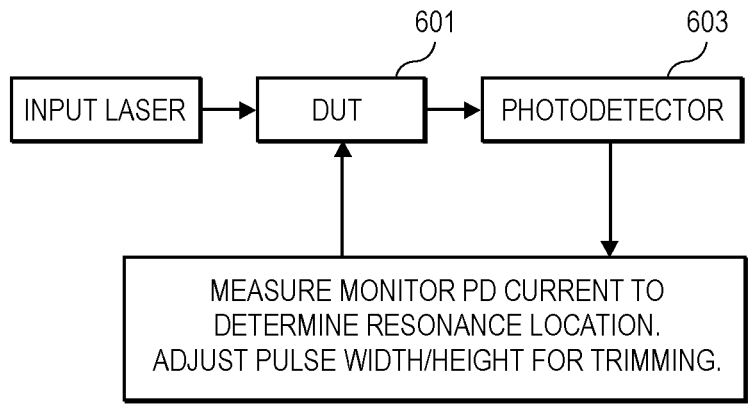
FIGS. 6(a)-6(b) illustrate the block diagram of a feedback loop that can enable trimming of a device under test (DUT) to a target wavelength, and the system performance, according to various embodiments.
Figure 6B:
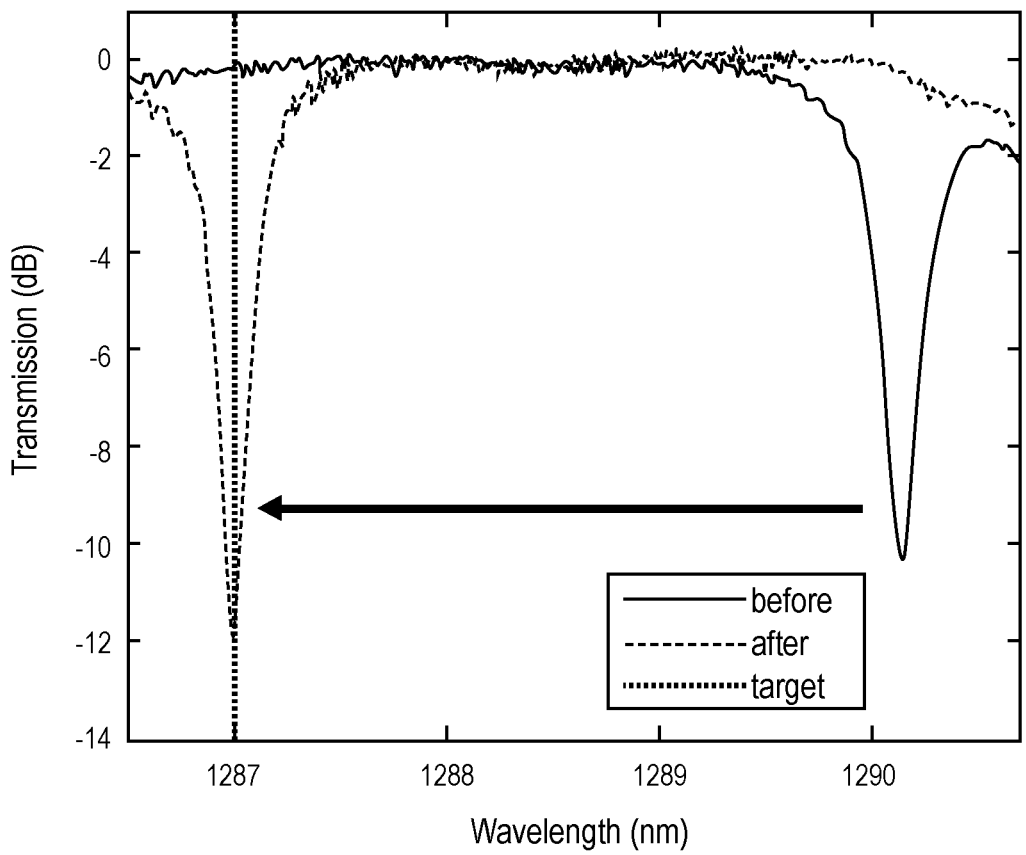

FIG. 4(b) shows the observed resonance wavelength movement after applying several voltage pulses to the heat element 401, e.g., the pn junction, to generate heat to adjust the refractive index and the wavelength of the semiconductor photonic device 400. The refractive index adjustment is permanent and is not done at real time when the semiconductor photonic device 400 is in operation. FIGS. 6(a)-6(b) demonstrate how the trimming conditions, e.g., voltage and duration of anneal, can be controlled using a pulse sequence to precisely set the resonance wavelength of such a device to the desired value.

FIG. 4(c) schematically illustrates optical phase shift achieved by a photonic device including an index trimmable section. In order to understand the optical phase and loss during the trimming process, microring modulators are fabricated in different dies, e.g., a die X1Y-2, a die X-1Y2, a die X-1Y-2, which are similar to that shown in FIG. 2(a) with various Ge implant conditions. FIG. 4(c) shows the maximum optical phase shift achieved for three Ge implant conditions. As refractive index of the waveguide is reduced during the trimming process, phase shift is expressed as a negative number. The doping conditions corresponding to the center column achieved the largest phase change of about 1.46 pi.

Figure 5:
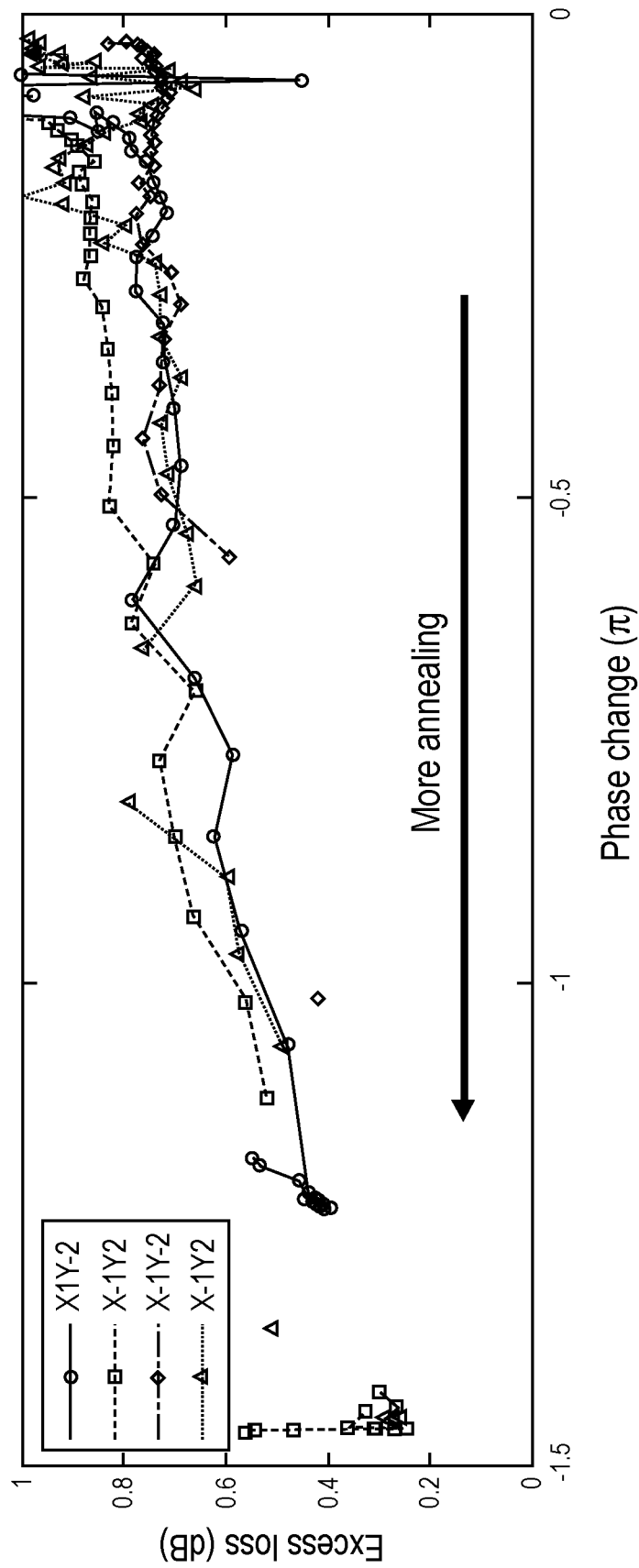
FIG. 5 schematically illustrates the excess loss in the ring modulator's waveguide during the trimming process, according to various embodiments.

FIG. 5 schematically illustrates the excess loss in the ring modulator's waveguide during the trimming process, according to various embodiments.

In embodiments, Ge doping also introduces excess loss to the waveguide, which should be taken into consideration in device design. FIG. 5 shows the excess loss in the ring modulator's waveguide during the trimming process. In order to estimate the excess loss, it is assumed that a 100 dB/cm loss in the waveguide before Ge implantation. In some embodiments, the waveguide seems to demonstrate that the pn junction heat element used in this design may not supply sufficient temperature to fully anneal the waveguide. In some other embodiments, a metal heater similar to the geometry shown in FIG. 2(c) may be used to increase the phase shift achieved and further reduce the loss by delivering higher temperatures to the device. For different applications, a pn junction heat element, a metal heater, or some other heat element may be chosen to fit the needs of the applications.

FIGS. 6(a)-6(b) illustrate the block diagram of a feedback loop that can enable trimming of a device under test (DUT) to a target wavelength, and the system performance, according to various embodiments.

In some embodiments, a device under test (DUT) 601, e.g., a ring modulator similar to the semiconductor photonic device 400 shown in FIG. 4(a), can be trimmed to align its resonance to a target wavelength. FIG. 6(a) shows the block diagram of a feedback loop that can enable trimming of the DUT 601 to a target wavelength. The heating element may be driven using a sequence of current or voltage pulses. After each pulse, the DUT 601 output is measured by a photodetector (PD) 603 to determine if the desired response is reached. Based on the measured signal and its deviation from the desired output, the trimming temperature may be continuously adjusted by tuning the height and duration of the next pulse. Generally, one can chose a PD configuration depending on the application and the type of DUT being trimmed. FIG. 6(b) shows the resonance movement towards the target wavelength. In embodiments, correction can be applied at scale at wafer-level or at module-level, providing a pathway toward large-scale and low-cost deployment of silicon photonics products.

Figure 7B:
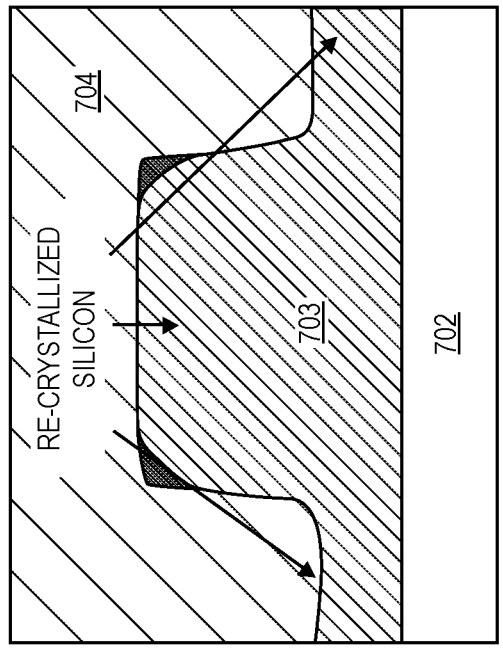
FIGS. 7(a)-7(b) illustrate images of a photonic device before and after trimming, and the system performance, according to various embodiments.
Figure 7A:
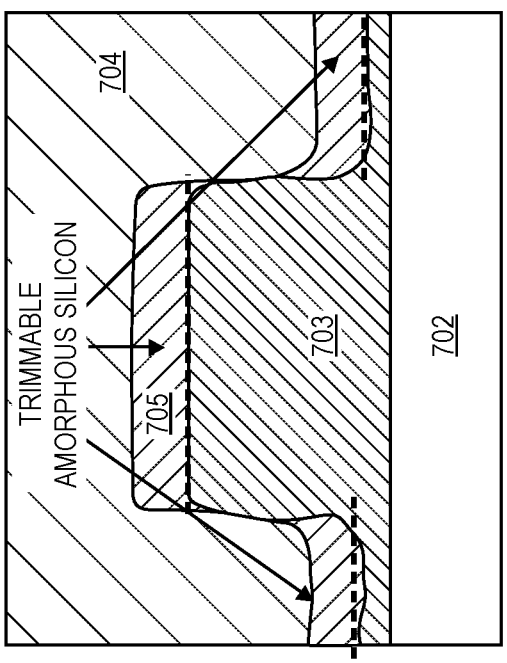

FIGS. 7(a)-7(b) illustrate images of a photonic device 700 before and after trimming, and the system performance, according to various embodiments.

In embodiments, as shown in FIG. 7(a), before trimming, the photonic device 700 may include a waveguide including a first section 705 containing amorphous silicon, and a second section 703 containing crystalline silicon. The waveguide is above a buried oxide layer 702 disposed above a substrate (not shown). One or more dielectric layers 704 may be disposed to embed the waveguide. After trimming, as shown in FIG. 7(b), the amorphous silicon of the first section 705 is partially or completely crystallized to generate crystalline silicon, which is the same as the crystalline silicon of the second section 703.

Figure 8:
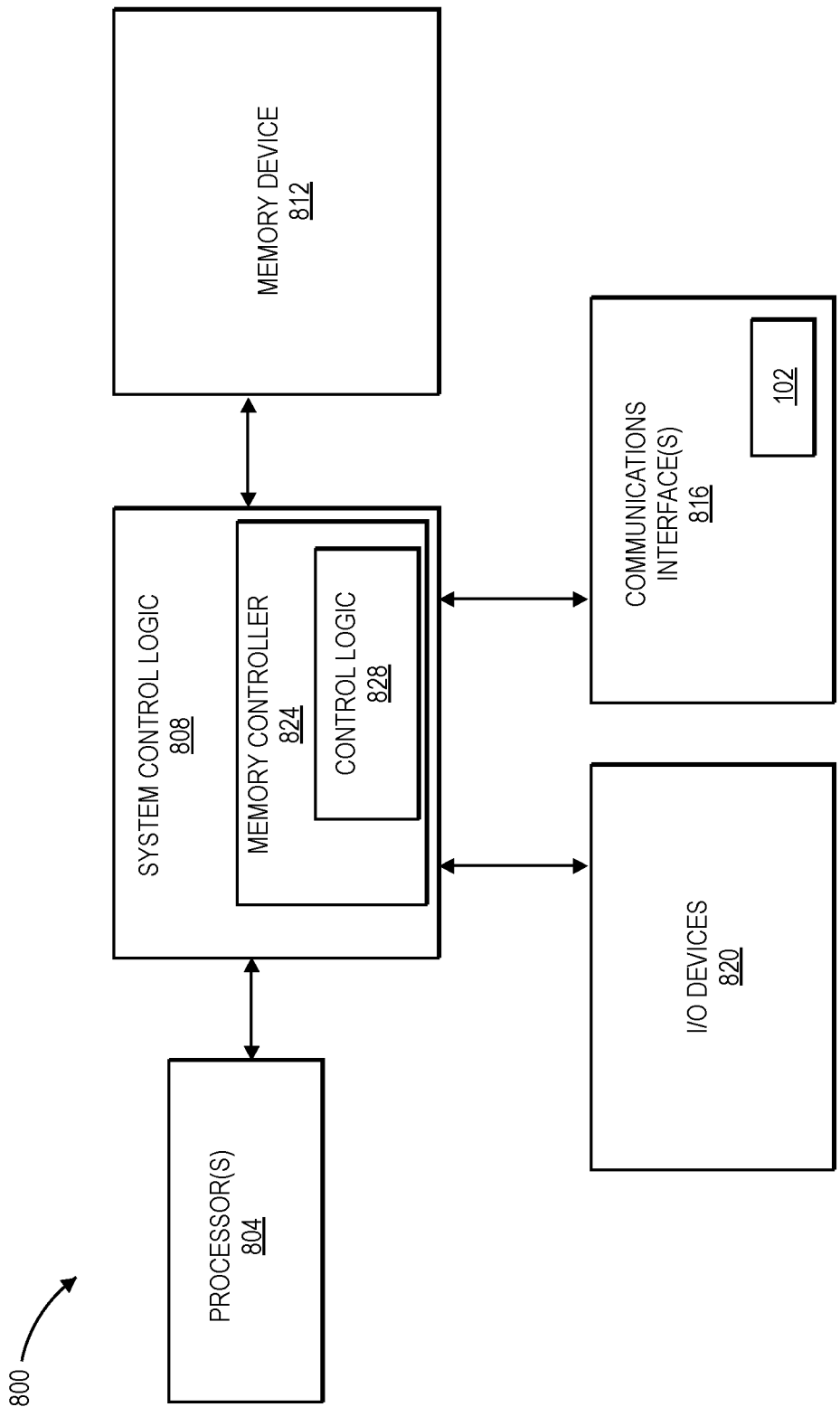
FIG. 8 schematically illustrates an exemplary computing and an optical device with a photonic tuning cell for use with various components and processes of FIGS. 1-7, according to various embodiments.

FIG. 8 schematically illustrates an exemplary computing and an optical device 800 with including a laser device for use with various components and processes of FIGS. 1-7(b), according to various embodiments.

The computing device 800 includes system control logic 808 coupled to one or more processor(s) 804; a memory device 812; one or more communications interface(s) 816; and input/output (I/O) devices 820. The memory device 812 may be a non-volatile computer storage chip (e.g., provided on the die). The memory device 812 may be configured to be removably or permanently coupled with the computing device 800.

Communications interface(s) 816 may provide an interface for computing device 800 to communicate over one or more network(s) and/or with any other suitable device. Communications interface(s) 816 may include any suitable hardware and/or firmware. Communications interface(s) 816 for one embodiment may include, for example, a network adapter, a wireless network adapter, a telephone modem, and/or a wireless modem. For wireless communications, communications interface(s) 816 for one embodiment may use one or more antennas to communicatively couple the computing device 800 with a wireless network. In embodiments, communication interface(s) 816 may include, or couple with, a transceiver, such as transmitter chip 102 of FIG. 1. In detail, the transmitter chip 102 includes a semiconductor photonic device 125, which may be an example of the photonic device 210, the photonic device 220, the photonic device 230, or the photonic device 240, as shown in FIGS. 2(a)-2(h), the semiconductor photonic device 310 shown in FIGS. 3(b)-3(c), the photonic device 400 shown in FIG. 4(a), the DUT 601 shown in FIG. 6(a), or the photonic device 700 shown in FIGS. 7(a)-7(b).

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

System control logic 808 for one embodiment may include any suitable interface controllers to provide for any suitable interface to at least one of the processor(s) 804 and/or to any suitable device or component in communication with system control logic 808. The system control logic 808 may move data into and/or out of the various components of the computing device 800.

System control logic 808 for one embodiment may include a memory controller 824 to provide an interface to the memory device 812 to control various memory access operations. The memory controller 824 may include control logic 828 that may be specifically configured to control access of the memory device 812.

In various embodiments, the I/O devices 820 may include user interfaces designed to enable user interaction with the computing device 800, peripheral component interfaces designed to enable peripheral component interaction with the computing device 800, and/or sensors designed to determine environmental conditions and/or location information related to the computing device 800. In various embodiments, the user interfaces could include, but are not limited to, a display, e.g., a liquid crystal display, a touch screen display, etc., a speaker, a microphone, one or more digital cameras to capture pictures and/or video, a flashlight (e.g., a light emitting diode flash), and a keyboard.

In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may additionally/alternatively be part of, or interact with, the communication interface(s) 816 to communicate with components of a positioning network, e.g., a global positioning system (GPS) satellite.

In various embodiments, the computing device 800 may be a mobile computing device such as, but not limited to, a laptop computing device, a tablet computing device, a netbook, a smartphone, etc.; a desktop computing device; a workstation; a server; etc. The computing device 800 may have more or fewer components, and/or different architectures. In further implementations, the computing device 800 may be any other electronic device that processes data.

EXAMPLES

Example 1 may include a semiconductor photonic device, comprising: a substrate; a waveguide disposed above the substrate, wherein the waveguide has a first section including amorphous silicon with a first refractive index, and a second section including crystalline silicon with a second refractive index different from the first refractive index; and a heat element at a vicinity of the first section of the waveguide, wherein the heat element is arranged to generate heat to transform the amorphous silicon of the first section of the waveguide to partially or completely crystallized crystalline silicon with a third refractive index, the amorphous silicon in the first section having been formed with silicon lattice defects caused by an element implanted into the first section.

Example 2 may include the semiconductor photonic device of example 1 and/or some other examples herein, wherein the element implanted into the first section includes Ge, Si, Boron, Arsenic, Phosphorus, Carbon, Helium, or Antimony.

Example 3 may include the semiconductor photonic device of example 1 and/or some other examples herein, wherein the element is implanted into the first section with an implantation ion dose ranging from about $3*10^{13}/cm^2$ to about $5*10^{15}/cm^2$ at an implantation energy ranging from about 30 KEV to 120 KEV.

Example 4 may include the semiconductor photonic device of example 1 and/or some other examples herein, wherein the heat element includes poly-Si, TiN, TaN, indium tin oxide (ITO), a transparent conductor, an electrically resistive metal material, a pn junction, or doped silicon.

Example 5 may include the semiconductor photonic device of example 1 and/or some other examples herein, wherein the heat element is to generate heat to warm up the amorphous silicon of the first section to a temperature around 400 C to around 800 C to transform the amorphous silicon of the first section of the waveguide to the partially or completely crystallized crystalline silicon.

Example 6 may include the semiconductor photonic device of example 1 and/or some other examples herein, further comprising a feedback loop to control the heat element to generate heat to warm up the amorphous silicon of the first section to transform the amorphous silicon of the first section of the waveguide to the partially or completely crystallized crystalline silicon with the third refractive index so that the third refractive index is substantially equal to the second refractive index.

Example 7 may include the semiconductor photonic device of example 1 and/or some other examples herein, wherein the first section has a volume so that when the amorphous silicon of the first section of the waveguide is transformed into the completely crystallized crystalline silicon, a phase shift in light propagating in the waveguide is larger than or equal to 2 pi compared to the waveguide with the first section having the amorphous silicon.

Example 8 may include the semiconductor photonic device of example 1 and/or some other examples herein, further comprising: an implanted region containing the element implanted into the first section, wherein the implanted region includes the first section of the waveguide, and further overlaps or covers a portion of the heat element.

Example 9 may include the semiconductor photonic device of example 8 and/or some other examples herein, wherein the heat element is a pn junction or doped silicon formed around side surfaces of the waveguide, and the implanted region further extends to include a portion of the pn junction or doped silicon.

Example 10 may include the semiconductor photonic device of example 8 and/or some other examples herein, wherein the heat element includes metal material formed above the waveguide, and the implanted region covers a portion of surface of the waveguide.

Example 11 may include the semiconductor photonic device of example 8 and/or some other examples herein, wherein the waveguide is a rib waveguide, and the heat element is a pn junction or doped silicon formed around two sides of the waveguide, and the implanted region includes a portion of the pn junction or doped silicon.

Example 12 may include the semiconductor photonic device of example 1 and/or some other examples herein, further comprising: one or more dielectric layers disposed to embed the waveguide and the heat element, wherein the one or more dielectric layers include a dielectric material.

Example 13 may include the semiconductor photonic device of example 12 and/or some other examples herein, wherein the dielectric material includes a material selected from the group consisting of silicon dioxide (SiO2), carbon doped oxide (CDO), silicon nitride, perfluorocyclobutane, polytetrafluoroethylene, fluorosilicate glass (FSG), organic polymer, silsesquioxane, siloxane, and organosilicate glass.

Example 14 may include the semiconductor photonic device of example 1 and/or some other examples herein, wherein the waveguide comprises a slab waveguide, a strip waveguide, a rib waveguide, or a surface ridge waveguide, and the waveguide includes Si or SiN, and the substrate includes a material selected from the group consisting of a silicon substrate, a glass substrate, a metal substrate, and a plastic substrate.

Example 15 may include the semiconductor photonic device of example 1 and/or some other examples herein, further comprising: a buried oxide layer disposed between the substrate and the waveguide.

Example 16 may include the semiconductor photonic device of example 1 and/or some other examples herein, wherein the semiconductor photonic device is a Mach-Zehnder interferometer, a ring resonator, a switch, a wavelength multiplexer, a waveguide coupler, or a grating coupler.

Example 17 may include a method for forming a semiconductor photonic device, comprising: forming a waveguide above a substrate, wherein the waveguide includes crystalline silicon with a first refractive index; forming a heat element above the waveguide or around a portion of the waveguide; and implanting an element into a first section of the crystalline silicon of the waveguide to cause silicon lattice defects to form amorphous silicon at the first section of the waveguide, wherein the first section including the amorphous silicon has a second refractive index different from the first refractive index; wherein the heat element is arranged to generate heat to transform the amorphous silicon of the first section of the waveguide to partially or completely crystallized crystalline silicon with a third refractive index.

Example 18 may include the method of example 17 and/or some other examples herein, wherein implanting the element into the first section of the crystalline silicon of the waveguide includes: forming a mask layer over the waveguide; forming one or more openings of the masking layer; and implanting the element into the first section of the crystalline silicon through the one or more openings.

Example 19 may include the method of example 17 and/or some other examples herein, wherein the heat element includes poly-Si, TiN, TaN, indium tin oxide (ITO), a transparent conductor, an electrically resistive metal material, a pn junction, or doped silicon.

Example 20 may include the method of example 17 and/or some other examples herein, wherein the element implanted into the crystalline silicon of the first section includes Ge, Si, Boron, Arsenic, Phosphorus, Carbon, Helium, or Antimony.

Example 21 may include the method of example 17 and/or some other examples herein, wherein the element is implanted into the first section with an implantation ion dose ranging from about $3*10^{13}/cm^2$ to about $5*10^{15}/cm^2$ at an implantation energy ranging from about 30 KEV to 120 KEV.

Example 22 may include an optical communication system comprising at least one optical apparatus, wherein the optical apparatus includes: a substrate; a waveguide disposed above the substrate, wherein the waveguide has a first section including amorphous silicon with a first refractive index, and a second section including crystalline silicon with a second refractive index different from the first refractive index; and a heat element at a vicinity of the first section of the waveguide, wherein the heat element is arranged to generate heat to transform the amorphous silicon of the first section of the waveguide to partially or completely crystallized crystalline silicon with a third refractive index, the amorphous silicon in the first section having been formed with silicon lattice defects caused by an element implanted into the crystalline silicon.

Example 23 may include the optical communication system of example 22 and/or some other examples herein, wherein the semiconductor photonic device is a Mach-Zehnder interferometer, a ring resonator, a switch, a wavelength multiplexer, a waveguide coupler, or a grating coupler.

Example 24 may include the optical communication system of example 22 and/or some other examples herein, further comprising: a buried oxide layer disposed between the substrate and the waveguide; and one or more dielectric layers disposed to embed the waveguide and the heat element, wherein the one or more dielectric layers include a dielectric material, wherein the dielectric material includes a material selected from the group consisting of silicon dioxide (SiO2), carbon doped oxide (CDO), silicon nitride, perfluorocyclobutane, polytetrafluoroethylene, fluorosilicate glass (FSG), organic polymer, silsesquioxane, siloxane, and organosilicate glass, and wherein the waveguide comprises a slab waveguide, a strip waveguide, a rib waveguide, or a surface ridge waveguide, and the waveguide includes Si or SiN.

Example 25 may include the optical communication system of example 22 and/or some other examples herein, wherein the heat element includes poly-Si, TiN, TaN, indium tin oxide (ITO), a transparent conductor, an electrically resistive metal material, a pn junction, or doped silicon; and wherein the element implanted into the crystalline silicon of the first section includes Ge, Si, Boron, Arsenic, Phosphorus, Carbon, Helium, or Antimony.

Example 26 may include an apparatus comprising: means for post process phase trimming a semiconductor photonic device using Ge implant and on-chip heaters.

Example 27 may include an apparatus comprising: means for post process index trimming a semiconductor photonic device using Ge implant and on-chip heaters.

Example 28 may include an apparatus comprising means to perform one or more elements of a method described in or related to any of examples herein, or any other method or process described herein.

Example 29 may include one or more non-transitory computer-readable media comprising instructions to cause an electronic device, upon execution of the instructions by one or more processors of the electronic device, to perform one or more elements of a method described in or related to any of examples herein, or any other method or process described herein.

Example 30 may include an apparatus comprising logic, modules, or circuitry to perform one or more elements of a method described in or related to any of examples herein, or any other method or process described herein.

Example 31 may include a method, technique, or process as described in or related to any of examples herein, or portions or parts thereof.

Example 32 may include an apparatus comprising: one or more processors and one or more computer readable media comprising instructions that, when executed by the one or more processors, cause the one or more processors to perform the method, techniques, or process as described in or related to any of examples herein, or portions thereof.

Example 33 may include a signal as described in or related to any of examples herein, or portions or parts thereof.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

These modifications may be made to the disclosure in light of the above detailed description. The terms used in the following claims should not be construed to limit the disclosure to the specific implementation disclosed in the specification and the claims. Rather, the scope of the disclosure is to be determined entirely by the following claims, which are to be construed in accordance with established doctrines of claim interpretation.

The invention claimed is:

1. A semiconductor photonic device, comprising:
a substrate;
a waveguide disposed above the substrate, wherein the waveguide includes:
an implanted region, wherein the implanted region includes a first section of the waveguide having amorphous silicon with a first refractive index, and an element implanted into the implanted region, wherein the element comprises Ge; and
a second section that is adjacent to and extends from the first section outside of the implanted region, wherein the second section includes crystalline silicon with a second refractive index that is different from the first refractive index; and
a heat element disposed in a vicinity of the first section of the waveguide, wherein the implanted region covers a portion of the heat element, wherein the heat element is arranged to generate heat to transform the amorphous silicon of the first section of the waveguide to partially or completely crystallized crystalline silicon with a third refractive index, the amorphous silicon in the first section having been formed with silicon lattice defects caused by the element implanted into the implanted region,
wherein the heat element is a pn junction formed around side surfaces of the waveguide, wherein the implanted region extends to include a portion of the pn junction, and wherein the heat element is arranged to increase a phase shift of light propagating in the waveguide to about 1.46π or higher and reduce excess optical loss to 0.3 dB or lower.

2. The semiconductor photonic device of claim 1, wherein the element is implanted into the first section with an implantation ion dose ranging from about $3*10^{13}/cm^2$ to about $5*10^{15}/cm^2$ at an implantation energy ranging from about 30 KEV to 120 KEV.

3. The semiconductor photonic device of claim 1, wherein the heat element includes poly-Si, TiN, TaN, indium tin oxide (ITO), a transparent conductor, an electrically resistive metal material, a pn junction, or doped silicon.

4. The semiconductor photonic device of claim 1, wherein the heat element is to generate heat to warm up the amorphous silicon of the first section to a temperature around 400 C to around 800 C to transform the amorphous silicon of the first section of the waveguide to the partially or completely crystallized crystalline silicon.

5. The semiconductor photonic device of claim 1, further comprising a feedback loop to control the heat element to generate heat to warm up the amorphous silicon of the first section to transform the amorphous silicon of the first section of the waveguide to the partially or completely crystallized crystalline silicon with the third refractive index so that the third refractive index is substantially equal to the second refractive index.

6. The semiconductor photonic device of claim 1, wherein the first section has a volume so that when the amorphous silicon of the first section of the waveguide is transformed into the completely crystallized crystalline silicon, a phase shift in light propagating in the waveguide is larger than or equal to 2 pi compared to the waveguide with the first section having the amorphous silicon.

7. The semiconductor photonic device of claim 1, wherein the heat element includes metal material formed above the waveguide, and the implanted region covers a portion of a surface of the waveguide.

8. The semiconductor photonic device of claim 1, wherein the waveguide is a rib waveguide, and the heat element is a pn junction or doped silicon formed around two sides of the waveguide, and the implanted region includes a portion of the pn junction or doped silicon.

9. The semiconductor photonic device of claim 1, further comprising:
one or more dielectric layers disposed to embed the waveguide and the heat element, wherein the one or more dielectric layers include a dielectric material.

10. The semiconductor photonic device of claim 9, wherein the dielectric material includes a material selected from a group consisting of silicon dioxide (SiO2), carbon doped oxide (CDO), silicon nitride, perfluorocyclobutane, polytetrafluoroethylene, fluorosilicate glass (FSG), organic polymer, silsesquioxane, siloxane, and organosilicate glass.

11. The semiconductor photonic device of claim 1, wherein the waveguide comprises a slab waveguide, a strip waveguide, a rib waveguide, or a surface ridge waveguide, and the waveguide includes Si or SiN, and
the substrate includes a material selected from the group consisting of a silicon substrate, a glass substrate, a metal substrate, and a plastic substrate.

12. The semiconductor photonic device of claim 1, further comprising:
a buried oxide layer disposed between the substrate and the waveguide.

13. The semiconductor photonic device of claim 1, wherein the semiconductor photonic device is a Mach-Zehnder interferometer, a ring resonator, a switch, a wavelength multiplexer, a waveguide coupler, or a grating coupler.

14. A method for forming a semiconductor photonic device, comprising:
forming a waveguide above a substrate, wherein the waveguide includes crystalline silicon with a first refractive index, including implanting an implanted region into the waveguide, wherein the implanted region includes a first section of the waveguide and an element implanted into the implanted region, wherein forming further includes providing a second section that is adjacent to and extends from the first section outside of the implanted region;
disposing a heat element above the waveguide or around a portion of the waveguide in a vicinity of the first section of the waveguide, including covering a portion of the heat element with the implanted region, including forming a pn junction around side surfaces of the waveguide, extending the implanted region to include a portion of the pn junction; and
implanting an element into the first section of the crystalline silicon of the waveguide to cause silicon lattice defects to form amorphous silicon at the first section of the waveguide, wherein the element comprises Ge, wherein the first section including the amorphous silicon has a second refractive index different from the first refractive index;
wherein the heat element is arranged to generate heat to transform the amorphous silicon of the first section of the waveguide to partially or completely crystallized crystalline silicon with a third refractive index, and
wherein the heat element is arranged to increase a phase shift of light propagating in the waveguide to about 1.46π or higher and reduce excess optical loss to 0.3 dB or lower.

15. The method of claim 14, wherein implanting the element into the first section of the crystalline silicon of the waveguide includes:
forming a mask layer over the waveguide;
forming one or more openings of the masking layer; and
implanting the element into the first section of the crystalline silicon through the one or more openings.

16. The method of claim 14, wherein the heat element includes poly-Si, TiN, TaN, indium tin oxide (ITO), a transparent conductor, an electrically resistive metal material, a pn junction, or doped silicon.

17. The method of claim 14, wherein the element is implanted into the first section with an implantation ion dose ranging from about $3*10^{13}/cm^2$ to about $5*10^{15}/cm^2$ at an implantation energy ranging from about 30 KEV to 120 KEV.

18. An optical communication system comprising at least one optical apparatus, wherein the optical apparatus includes:
a substrate;
a waveguide disposed above the substrate, wherein the waveguide includes:
an implanted region, wherein the implanted region includes a first section including amorphous silicon with a first refractive index, an element implanted into the implanted region, the element comprising Ge, and a second section that is adjacent to and extends from the first section outside of the implanted region, wherein the second section includes crystalline silicon with a second refractive index different from the first refractive index; and
a heat element disposed in a vicinity of the first section of the waveguide, wherein the implanted region covers a portion of the heat element, wherein the heat element is arranged to generate heat to transform the amorphous silicon of the first section of the waveguide to partially or completely crystallized crystalline silicon with a third refractive index, the amorphous silicon in the first section having been formed with silicon lattice defects caused by the element implanted into the implanted region,
wherein the heat element is a pn junction formed around side surfaces of the waveguide, wherein the implanted region extends to include a portion of the pn junction, and wherein the heat element is arranged to increase a phase shift of light propagating in the waveguide to about 1.46π or higher and reduce excess optical loss to 0.3 dB or lower.

19. The optical communication system of claim 18, wherein the optical apparatus is a Mach-Zehnder interferometer, a ring resonator, a switch, a wavelength multiplexer, a waveguide coupler, or a grating coupler.

20. The optical communication system of claim 18, further comprising:
a buried oxide layer disposed between the substrate and the waveguide; and
one or more dielectric layers disposed to embed the waveguide and the heat element, wherein the one or more dielectric layers include a dielectric material, wherein the dielectric material includes a material selected from a group consisting of silicon dioxide (SiO2), carbon doped oxide (CDO), silicon nitride, perfluorocyclobutane, polytetrafluoroethylene, fluorosilicate glass (FSG), organic polymer, silsesquioxane, siloxane, and organosilicate glass, and
wherein the waveguide comprises a slab waveguide, a strip waveguide, a rib waveguide, or a surface ridge waveguide, and the waveguide includes Si or SiN.

21. The optical communication system of claim 18, wherein the heat element includes poly-Si, TiN, TaN, indium tin oxide (ITO), a transparent conductor, an electrically resistive metal material, a pn junction, or doped silicon.

* * * * *